US012000401B2

(12) United States Patent
Heo et al.

(10) Patent No.: US 12,000,401 B2
(45) Date of Patent: Jun. 4, 2024

(54) ROTARY COMPRESSOR WITH FIRST AND SECOND MAIN SUCTION PORTS

(71) Applicant: Samsung Electronics Co., Ltd., Suwon-si (KR)

(72) Inventors: Hyolim Heo, Suwon-si (KR); Joonhyung Kim, Suwon-si (KR); Munseong Kwon, Suwon-si (KR); Soodol Park, Suwon-si (KR); Jaewoo Park, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 17/684,291

(22) Filed: Mar. 1, 2022

(65) Prior Publication Data

US 2022/0186731 A1 Jun. 16, 2022

Related U.S. Application Data

(63) Continuation of application No. PCT/KR2020/007790, filed on Jun. 16, 2020.

(30) Foreign Application Priority Data

Sep. 4, 2019 (KR) ........................ 10-2019-0109409

(51) Int. Cl.

*F04C 29/12* (2006.01)
*F04C 18/356* (2006.01)
*F25B 31/02* (2006.01)

(52) U.S. Cl.

CPC ............ *F04C 29/12* (2013.01); *F04C 18/356* (2013.01); *F04C 18/3564* (2013.01);

(Continued)

(58) Field of Classification Search

CPC .......... F04C 2/321-3568; F04C 18/321-3568; F04C 15/06; F04C 29/12; F04C 2250/10-101

See application file for complete search history.

(56) References Cited

U.S. PATENT DOCUMENTS 9,429,156 B2 8/2016 Seol et al.
10,006,460 B2 6/2018 Nagasawa et al.

(Continued)

FOREIGN PATENT DOCUMENTS

CN 202391780 U * 8/2012
CN 103883529 A * 6/2014

(Continued)

OTHER PUBLICATIONS

International Search Report and Written Opinion of the International Searching Authority dated Sep. 4, 2020, in connection with International Application No. PCT/KR2020/007790, 12 pages.

(Continued)

*Primary Examiner* — Laert Dounis

(57) ABSTRACT

This rotary compressor comprises: a casing forming the outer shape; a rolling piston configured to rotate eccentrically in an internal space; a vane configured to contact the rolling piston and divide the internal space into a suction chamber and a compression chamber; and a main suction port connecting the suction chamber to an outside of the cylinder. The rotary compressor also comprises: a cylinder disposed inside the casing; a first flange disposed above the cylinder; and a second flange disposed below the cylinder. The main suction port comprises a sub suction port extending in a direction in which at least one among the first flange and the second flange is disposed, and at least one among the first flange and the second flange has a flow path groove connecting the sub suction port and the suction chamber.

15 Claims, 20 Drawing Sheets

(52) U.S. Cl.
CPC ........ *F25B 31/026* (2013.01); *F04C 2210/26* (2013.01); *F04C 2250/101* (2013.01); *F05B 2210/14* (2013.01)

(56) References Cited

U.S. PATENT DOCUMENTS

| | | | |
|---|---|---|---|
| 11,060,522 B2 | 7/2021 | Morozumi | |
| 2005/0013720 A1 | 1/2005 | Wilk et al. | |
| 2008/0107556 A1* | 5/2008 | Bae | F04C 28/04 418/63 |
| 2023/0125736 A1* | 4/2023 | Shin | F04C 29/124 418/269 |

FOREIGN PATENT DOCUMENTS

| | | | | | |
|---|---|---|---|---|---|
| CN | 104819154 | A | * | 8/2015 | F04C 18/356 |
| CN | 205243858 | U | * | 5/2016 | |
| EP | 3550147 | A1 | * | 10/2019 | |
| JP | S61-241490 | A | | 10/1986 | |
| JP | 05099170 | A | * | 4/1993 | |
| JP | 07332271 | A | * | 12/1995 | |
| JP | 2000-199488 | A | | 7/2000 | |
| JP | 3157137 | B2 | | 4/2001 | |
| JP | 2003-214370 | A | | 7/2003 | |
| JP | 2012188982 | A | * | 10/2012 | |
| JP | 2014190267 | A | * | 10/2014 | |
| JP | 6102287 | B2 | | 3/2017 | |
| JP | 2018-076817 | A | | 5/2018 | |
| JP | 6324091 | B2 | | 5/2018 | |
| KR | 20040038331 | A | * | 5/2004 | |
| KR | 100531278 | B1 | * | 11/2005 | |
| KR | 10-2007-0073314 | A | | 7/2007 | |
| KR | 20090011246 | U | * | 11/2009 | |
| KR | 10-2010-0033838 | A | | 3/2010 | |
| KR | 20100033838 | A | * | 3/2010 | |
| KR | 10-1376606 | B1 | | 3/2014 | |
| KR | 10-2014-0086482 | A | | 7/2014 | |
| KR | 10-2014-0086557 | A | | 7/2014 | |
| KR | 10-1587174 | B1 | | 1/2016 | |
| KR | 10-2019-0011141 | | | 2/2019 | |
| WO | WO-2019045656 | A1 | * | 3/2019 | |
| WO | WO-2023084722 | A1 | * | 5/2023 | |

OTHER PUBLICATIONS

Request for the Submission of an Opinion issued Mar. 22, 2024, in connection with Korean Patent Application No. 10-2019-0109409, 12 pages.

* cited by examiner

ROTARY COMPRESSOR WITH FIRST AND SECOND MAIN SUCTION PORTS

CROSS-REFERENCE TO RELATED APPLICATIONS

This application is a bypass continuation of International Application No. PCT/KR2020/007790, filed Jun. 16, 2020, which claims priority to Korean Patent Application No. 10-2019-0109409, filed Sep. 4, 2019, the disclosures of which are herein incorporated by reference in their entirety.

BACKGROUND

1. Field

This disclosure relates to a rotary compressor with improved compression efficiency and a home appliance including the same.

2. Description of Related Art

A compressor is a mechanical device that compresses air, refrigerant or other various gases using a motor or a turbine to increase pressure. The compressor may be variously used throughout the industry, and when used in a refrigerant cycle, the compressor may convert low-pressure refrigerant into a high-pressure refrigerant and may transfer the refrigerant back to a condenser.

In a large category, the compression is classified into a reciprocating compressor in which a compression space to suck and discharge operating gas between a piston and a cylinder is formed so that the piston, while rectilinearly reciprocating, compresses refrigerant, a scroll compressor in which a compression space to suck and discharge gas between a reciprocating scroll and a fixed scroll so that the reciprocating scroll, while rotating along the fixed scroll, compresses a refrigerant, and a rotary compressor in which a compression space to suck and discharge gas between eccentrically rotating rolling piston and the cylinder so that the rolling piston eccentrically rotates along an inner wall of the cylinder and compresses a refrigerant.

However, the rotary compressor had a problem that flow congestion of a refrigerant may occur in an inlet into a cylinder, thereby reducing the compression efficiency. Accordingly, there is a need of improving the compression efficiency of the rotary compressor.

SUMMARY

Various embodiments of the disclosure may provide a rotary compressor and a home appliance including the same to improve compression efficiency of a structure of a suction port of the compressor.

Provided is a rotary compressor including a casing forming an outer shape, a cylinder having an internal space, disposed inside the casing and comprising a rolling piston configured to rotate eccentrically in the internal space, a vane configured to contact the rolling piston and divide the internal space into a suction chamber and a compression chamber, and a main suction port connecting the outside and the suction chamber; a first flange disposed above the cylinder; and second flange disposed below the cylinder, and the main suction port may include a sub suction port extending in a direction in which at least one among the first flange and the second flange is disposed, and at least one among the first flange and the second flange may include a flow path groove connecting the sub suction port and the suction chamber.

The sub suction port may include a first sub-suction port extending in a direction in which the first flange is disposed and a second sub-suction port extending in a direction in which the second flange is disposed, the first flange may include a first flow path groove that is disposed on a surface contacting the cylinder to connect the first sub-suction port to the suction chamber, and the second flange may include a second flow path groove that is disposed on a surface contacting the cylinder to connect the second sub-suction port to the suction chamber.

The a central axis first sub-suction port may be parallel to a central axis of the second sub-suction port.

Each of the first sub-suction port and the second sub-suction port may be spaced apart from the internal space of the cylinder and may be disposed to be adjacent to the suction chamber in relation to the internal space.

The first flow path groove is arranged on the first flange to face the second flow path groove arranged on the second flange.

The main suction port may include a first main suction port disposed at an outer circumferential surface of the cylinder and has a first cross-sectional area; and a second main suction port disposed at an inner circumferential surface of the cylinder, connected to the first main suction port, and has a second cross-sectional area smaller than the first cross-sectional area.

A cross section of the second main suction port may be in an ellipse shape having a long axis and a short axis, and the short axis may be disposed in a direction of rotary movement of the rolling piston.

A central axis of the first main suction port may be disposed coaxially to a central axis of the second main port.

The central axis of the second main suction port may be disposed to be closer to the vane with respect to a rotary movement direction of the rolling piston than the central axis of the first main suction port.

The flow path groove may be formed in relation to the suction chamber so as to overlap with a rotation radius of the rolling piston.

The cylinder may include a discharge port connected to the compression chamber, and the first flange may include a check valve disposed in the discharge port and opens the discharge port if pressure inside the compression chamber is greater than or equal to a preset pressure.

The disclosure provides a home appliance for adjusting temperature through heat exchange with the outside using a refrigerant. The home appliance may include a rotary compressor configured to compress a refrigerant, and the rotary compressor includes a casing forming an outer shape, a cylinder having an internal space, disposed inside the casing and comprising a rolling piston that rotates eccentrically in the internal space, a vane that contacts the rolling piston and divides the internal space into a suction chamber and a compression chamber, a main suction port connecting the outside and the suction chamber, a first flange disposed at an upper portion of the cylinder, a second flange disposed at a lower portion of the cylinder, the main suction port may include the sub suction port extending in a direction in which at least one of the first flange and the second flange is disposed, and at least one of the first flange and the second flange may include a flow path groove connecting the sub suction port and the suction chamber.

The home appliance may be one of an air-conditioner, a refrigerator, and a freezer.

The rotary compressor and the home appliance including the same may have a structure by which compression efficiency is improved.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 15, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Examples described hereinafter are provided for comprehensive understanding of the disclosure, and it should be understood that various changes may be made to examples described herein and the disclosure may be embodied in different forms. The description of the present embodiments is provided so that the disclosure of the disclosure is complete, and a person skilled in the art, to which this disclosure belongs, can be fully informed the scope of the disclosure. It should be noted that the drawings are provided for comprehensive understanding of the disclosure, and the dimensions of some elements may be exaggerated for clarity and convenience.

It will be understood that when an element is referred to as being "on" or "connected to" another element, the element may be directly connected to the other element or intervening elements may also be present. Further, when an element is referred to as being "directly on" or "directly connected to" another element, no intervening elements may be present. Other expressions describing relationships between components such as "between" and "directly adjacent to" may be construed in a similar manner as "connected to" and "directly connected to," respectively.

The terms such as "first," "second," etc., may be used to describe a variety of elements, but the elements should not be limited by these terms. The terms may be used to distinguish an element from another element. The use of such ordinal numbers should not be construed as limiting the meaning of the term. For example, without departing from the scope of the disclosure, a "first component" may be referred to as a "second component," and similarly, the "second component" may also be referred to as a "first component."

Singular forms in the disclosure may include the plural forms as well, unless the context clearly indicates otherwise. It will be further understood that terms such as "including," "having," etc., may indicate the existence of the features, numbers, operations, actions, components, parts, or combinations thereof, disclosed in the specification, and are not intended to preclude the possibility that one or more other features, numbers, operations, actions, components, parts, or combinations thereof, may exist or may be added.

Unless otherwise defined, all terms used herein have the same meaning as commonly understood by one of ordinary skill in the art to which this disclosure pertains.

Figure 1:
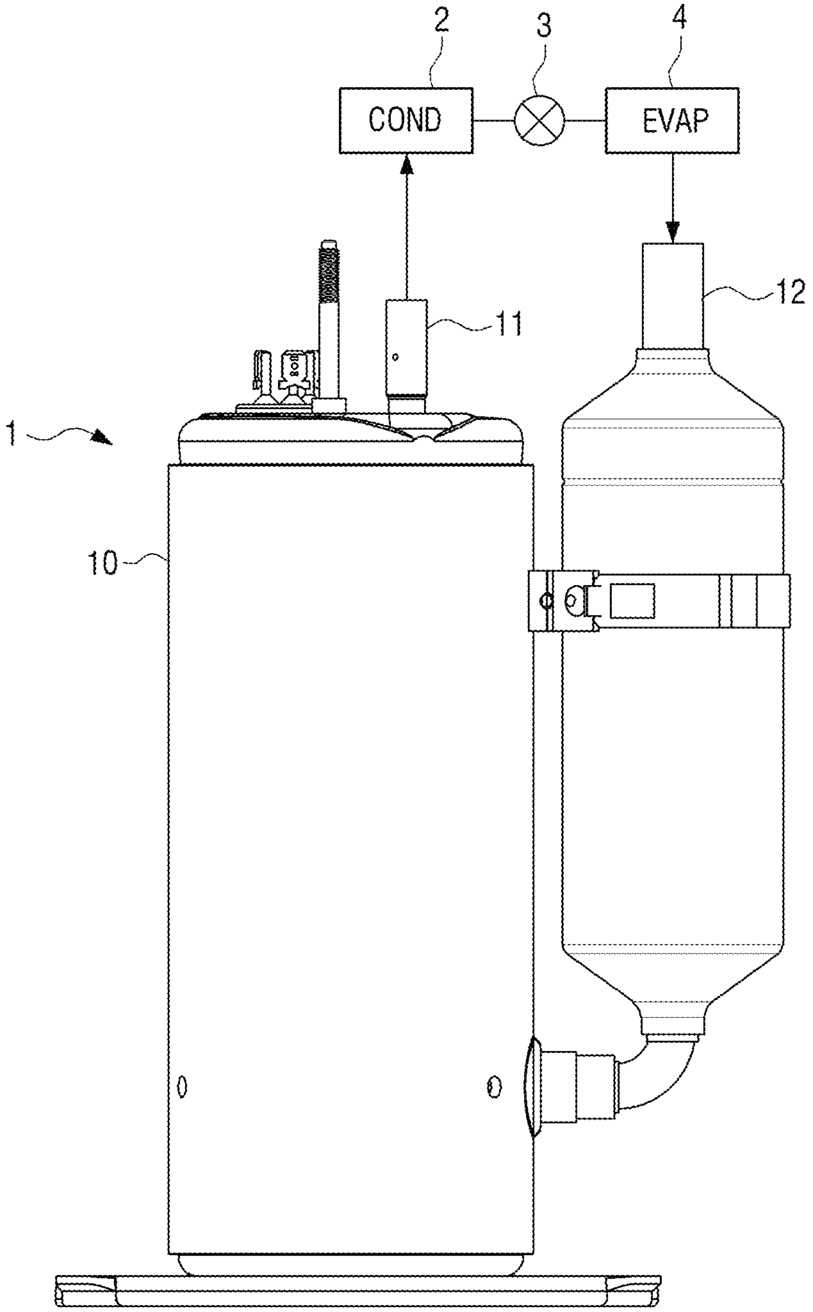
FIG. 1 is a schematic diagram illustrating a cooling cycle provided in a home appliance according to an embodiment of the disclosure.
Figure 2:
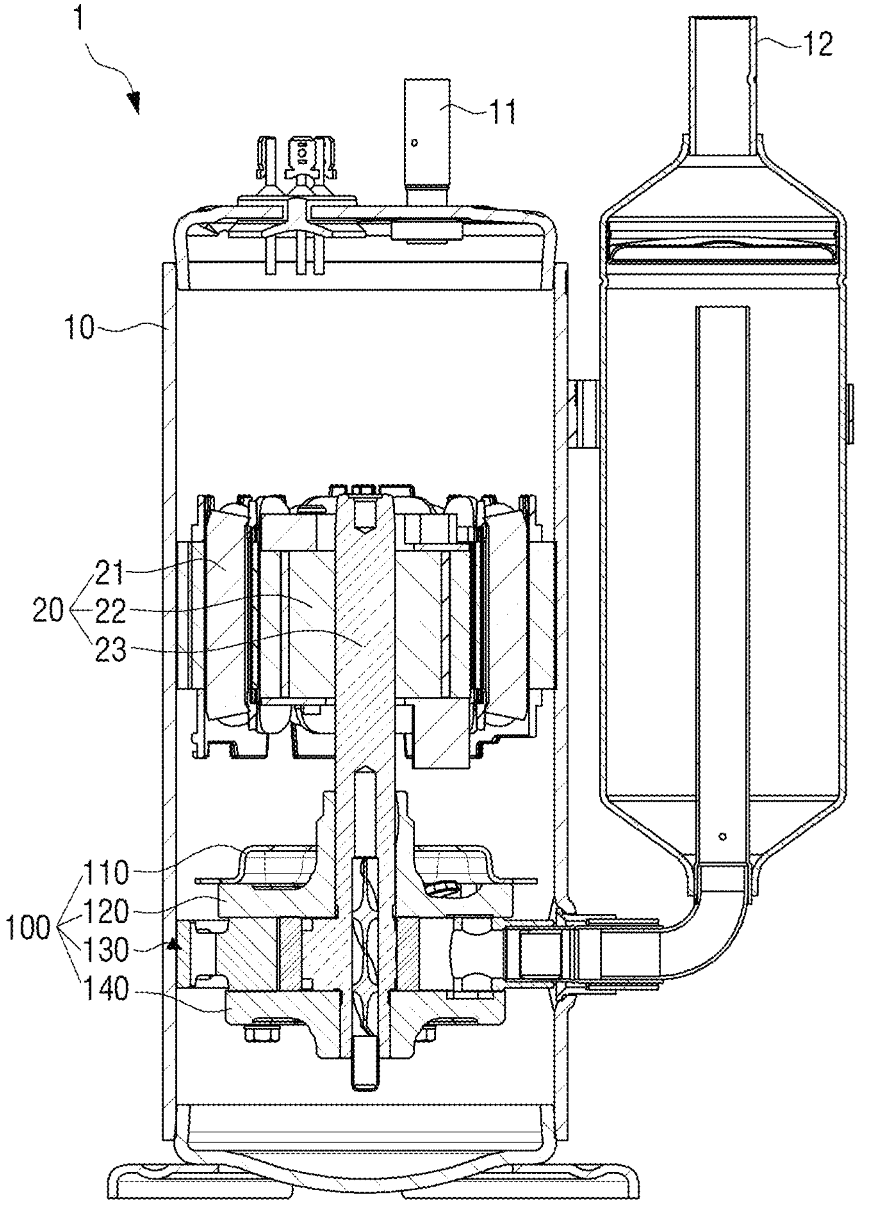
FIG. 2 is a cross-sectional diagram of a rotary compressor according to an embodiment of the disclosure.

With reference to FIG. 1 or 2, the home appliance having a cooling cycle and a rotary compressor 1 will be described according to an embodiment.

FIG. 1 is a schematic diagram illustrating a cooling cycle provided in a home appliance according to an embodiment of the disclosure; FIG. 2 is a cross-sectional diagram of a rotary compressor 1 according to an embodiment of the disclosure.

As shown in FIG. 1, the freezing cycle has four steps of compression, condensation, expansion, and evaporation, and the four of compression, condensation, expansion, and evaporation are generated while the refrigerant circulates through a rotary compressor 1, a condenser 2, an expansion valve 3, and an evaporator 4.

The rotary compressor 1 may compress the refrigerant gas in a high-temperature and high-pressure state and discharge the gas, and the high-temperature and high-pressure refrigerant gas discharged from the rotary compressor 1 may flow into the condenser 2.

The condenser 2 may condense the refrigerant compressed in the compressor 1 onto a liquid phase, and emit heat around through the condensation process.

The expansion valve 3 may expand the refrigerant in the high temperature and high pressure state condensed by the condenser 2 into a low pressure state, and the evaporator 4 may perform a function of evaporating the refrigerant expanded in the expansion valve 3 by heat exchange with a cooling object using the evaporation latent heat to return the refrigerant gas in a low temperature and low pressure state to the rotary compressor 1, and, through this cycle, may adjust the air temperature of the indoor space.

The home appliance having such a cooling cycle may be one of an air conditioner, a refrigerator, and a freezer. However, the embodiment is not limited thereto, and may be used in various home appliances having a cooling cycle.

The rotary compressor 1 may include a refrigerant inlet 12 connected to the evaporator 4 to introduce a refrigerant from the evaporator 4, and a refrigerant outlet 11 connected to the condenser 2 and discharging the refrigerant compressed at a high temperature and high pressure from the rotary compressor 1.

The rotary compressor 1 may include a casing 10 forming the exterior thereof, a compression device 100 provided inside the casing 10 to compress the refrigerant introduced through the refrigerant inlet 12, and a driver 20 connected to the compression device 100 to drive the compression device 100.

The casing 10 may partition the inside of the casing 10 from the outside, and may seal the inside of the casing 10 from the outside such that the refrigerant compressed by the compression device 100 is discharged only to the refrigerant outlet 11. The shape of the casing 10 may vary as needed.

The driver 20 may include a stator 21 fixed to the inner surface of the casing 10, a rotor 22 rotatably installed in the stator 21, and a rotary shaft 23 provided inside the rotor 22 to rotate with the rotor 22.

The rotary shaft 23 may be connected to the compression device 100 to rotate the rolling piston 133 of the compression device 100 to compress the refrigerant introduced into the compression device 100.

Accordingly, the driver 20 may be connected to the compression device 100 through the rotary shaft 23 to transmit power to the compression device 100.

With reference to FIGS. 3 to 8, a structure of the compression device 100 according to an embodiment will be described.

Figure 3:
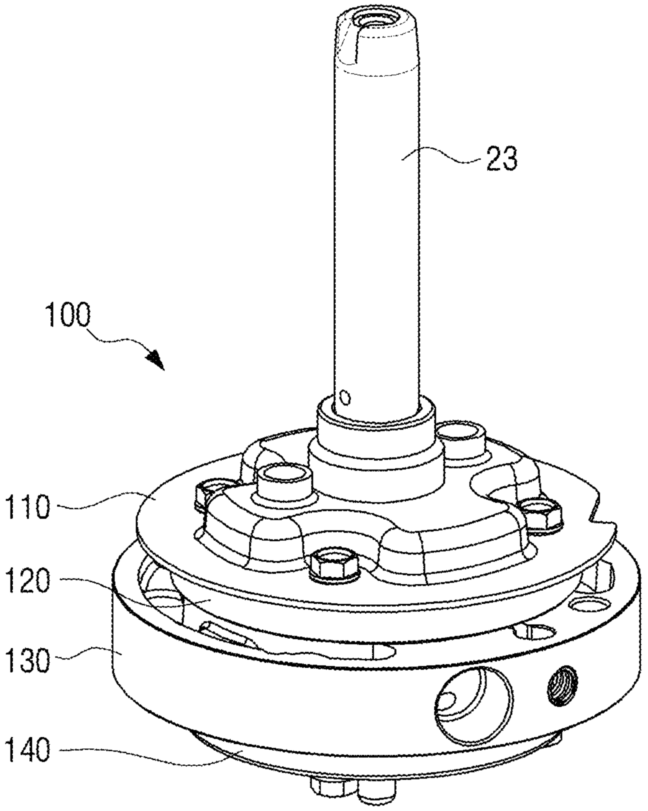
FIG. 3 is a perspective view illustrating a compression device according to an embodiment of the disclosure.
Figure 4:
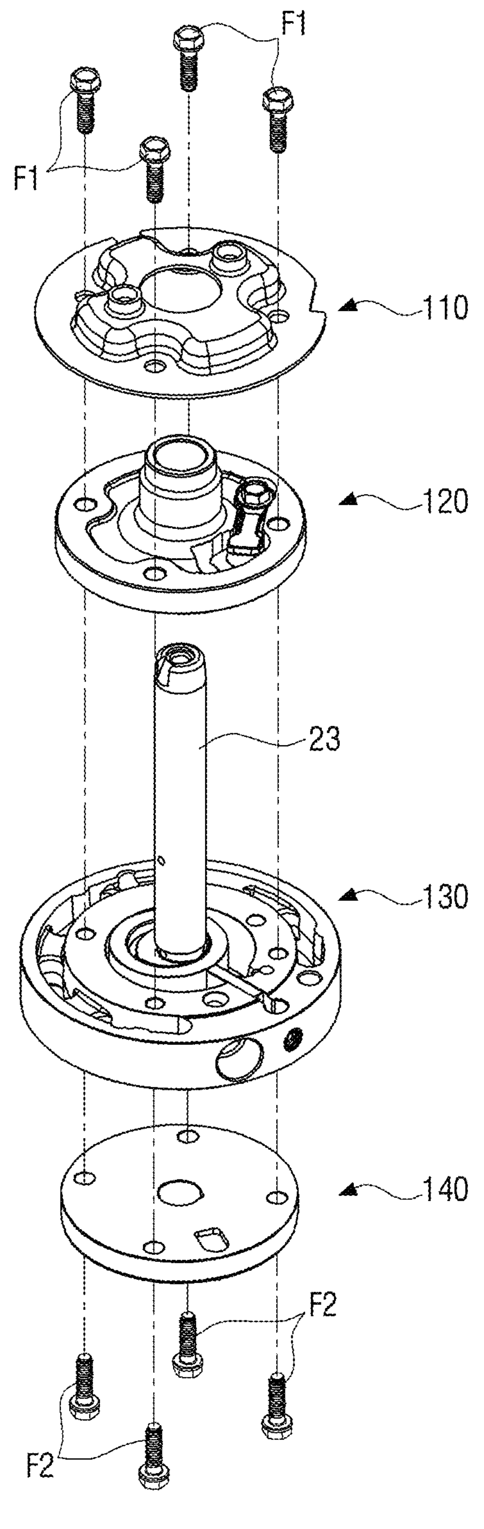
FIG. 4 is an exploded perspective view of a compression device according to an embodiment of the disclosure.
Figure 5A:
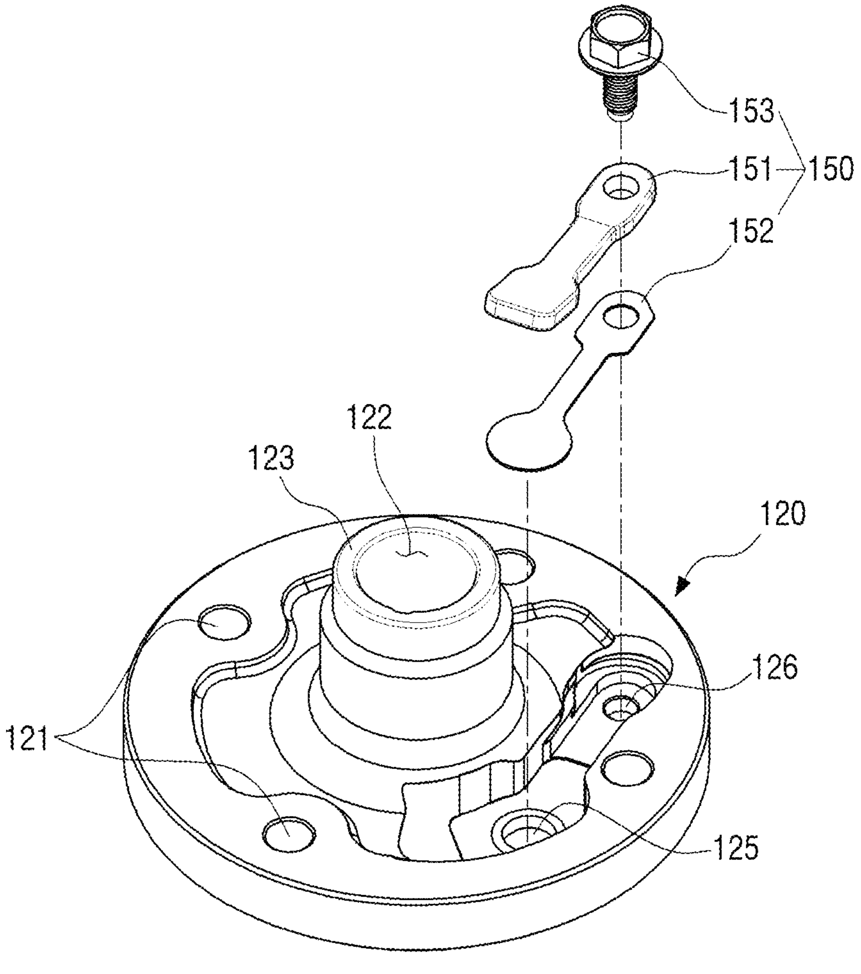
FIG. 5A is an upper exploded perspective view illustrating a first flange according to an embodiment of the disclosure.
Figure 5B:
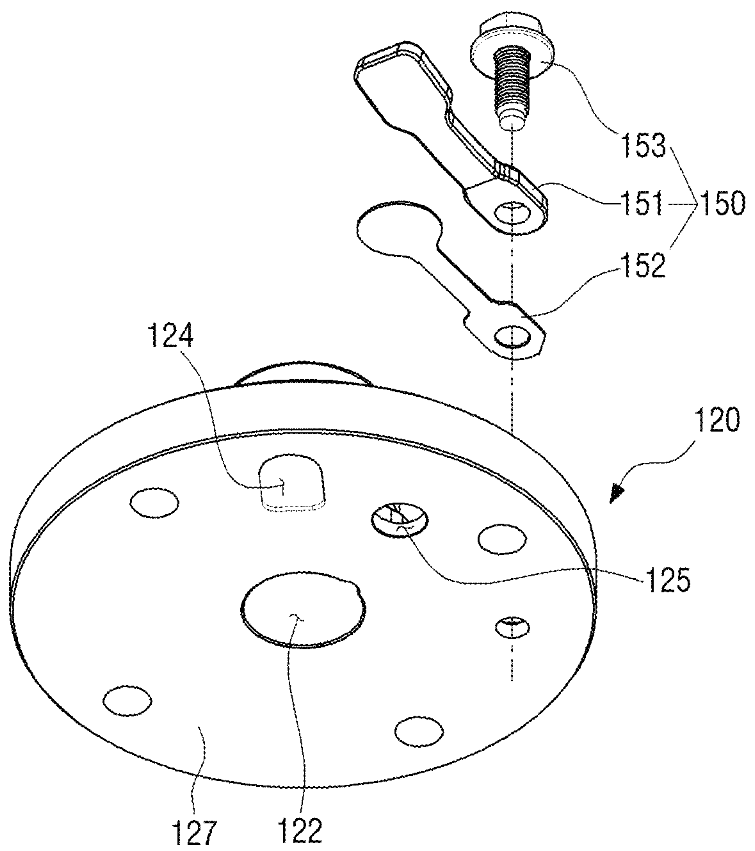
FIG. 5B is a lower exploded perspective view illustrating a first flange according to an embodiment of the disclosure.
Figure 6:
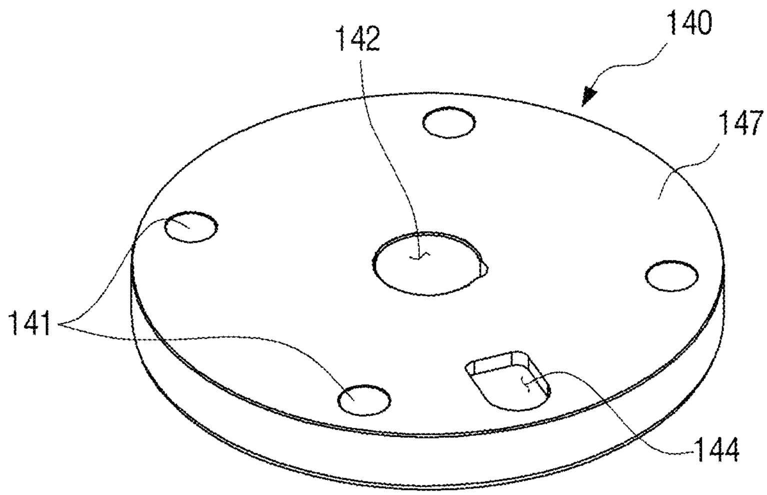
FIG. 6 is a perspective view illustrating a second flange according to an embodiment of the disclosure.
Figure 7:
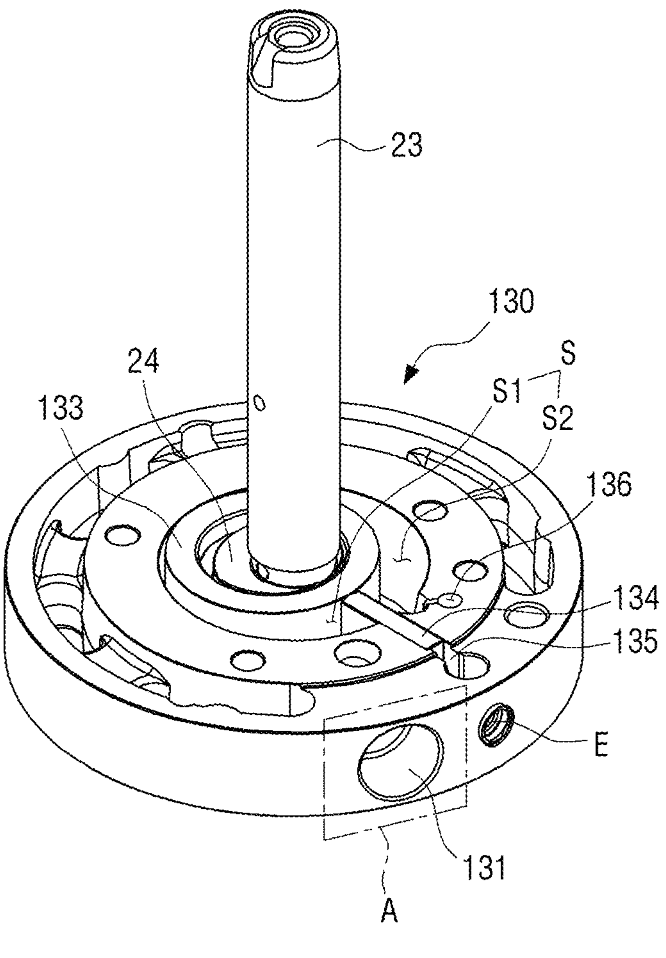
FIG. 7 is a perspective view illustrating a cylinder connected to a rotary shaft according to an embodiment of the disclosure.
Figure 8:
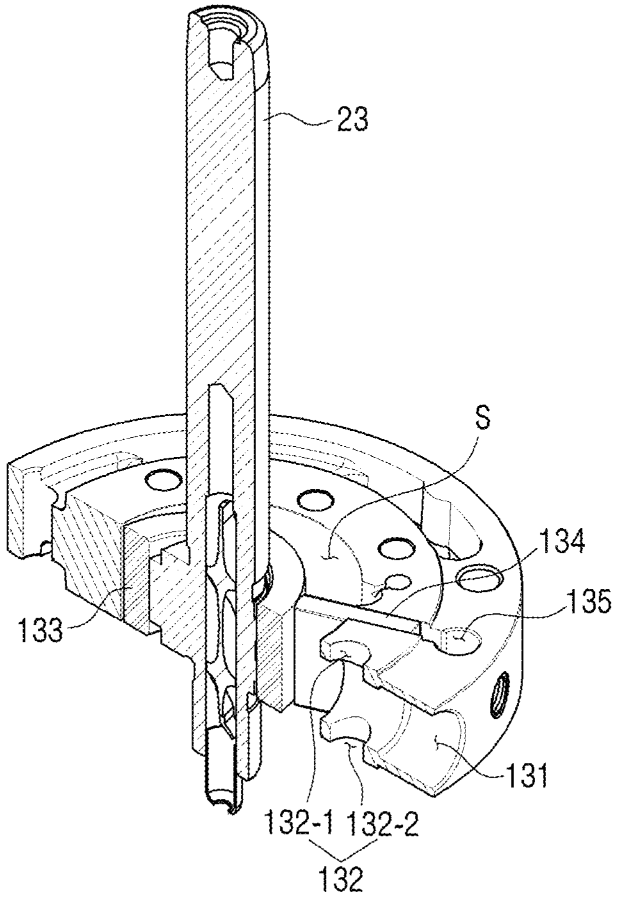
FIG. 8 is a cross-sectional perspective view taken along C-C line of FIG. 7.

FIG. 3 is a perspective view illustrating a compression device 100 according to an embodiment of the disclosure; FIG. 4 is an exploded perspective view of a compression device 100 according to an embodiment of the disclosure; FIG. 5A is an upper exploded perspective view illustrating a first flange 120 according to an embodiment of the disclosure; FIG. 5B is a lower exploded perspective view illustrating a first flange 120 according to an embodiment of the disclosure; FIG. 6 is a perspective view illustrating a second flange 140 according to an embodiment of the disclosure; FIG. 7 is a perspective view illustrating a cylinder 130 connected to a rotary shaft 23 according to an embodiment of the disclosure; and FIG. 8 is a cross-sectional perspective view taken along C-C line of FIG. 7.

Referring to FIGS. 3 and 4, the compression device 100 may include a cylinder 130 having an internal space S in which the sucked refrigerant is compressed, a first flange 120 disposed on an upper portion of the cylinder 130, a second flange 140 disposed under the cylinder 130, and a cover member 110 disposed on an upper portion of the first flange 120 to guide the compressed refrigerant from the internal space S to the refrigerant outlet 11.

The first flange 120 and the second flange 140 may be coupled with the cylinder 130 and form the internal space S of the cylinder 130.

Referring to FIGS. 5A and 5B, the first flange 120 may include a first fixing hole 121 connected to the cover member 110 through the first fixing member F1, a first rotary shaft hole 122 connecting the rotary shaft 23 and the first flange 120, and a rotary shaft fixing portion 123 forming the first rotary shaft hole 122 and protruding toward an upper direction of the central shaft of the first flange 120.

The first flange 120 may be disposed on an upper portion of the cylinder 130 and may be connected to the cylinder 130. Here, the first flange 120 may be connected to the cylinder 130 through a mechanical connection to cover the upper surface of the internal space S of the cylinder 130.

The first flange 120 may include a discharge hole 125 connected to a discharge port 136 (see FIG. 7) of the cylinder 130, and a check valve fixture 126 for fixing the check valve 150 disposed in the discharge hole 125.

The first flange 120 may be coupled with the cylinder 130 so that the discharge hole 125 is connected to the discharge port 136 of the cylinder 130.

At least one of the first flange 120 and the second flange 140 may include flow path grooves 124, 144 connecting the sub-suction port 132 to the suction chamber S1.

The first flange 120 may include a first flow path groove 124 disposed on one surface 127 contacting the cylinder 130 to connect a first sub-suction port 132-1 to the suction chamber S1 (see FIG. 12).

A surface 127 of the first flange 120 may refer to a lower surface of the first flange 120 adjacent to the cylinder 130.

The first flow path groove 124 may be connected to the first sub-suction port 132-1 and may guide the refrigerant introduced from the main suction port 131 to the suction chamber S1 of the internal space S.

The first flow path groove 124 may form the first sub flow path G2 along with the first sub-suction port 132-1 to guide a portion of the refrigerant introduced from the main flow path G1 to the suction chamber S1.

Accordingly, when the refrigerant flows from the outside of the compression device 100 to the suction chamber S1, the first sub-flow path G2 may guide the stagnant refrigerant generated by the vortex in the main flow path G1 to the suction chamber S1, thereby increasing the inflow amount of the refrigerant flowing into the suction chamber S1, and the compression efficiency of the rotary compressor 1 may be improved.

The flow path grooves 124 and 144 may extend to the suction chamber S1 to overlap the rotation radius of the rolling piston 133. Accordingly, the second and third sub-flow paths G2 and G3 formed by the flow path grooves 124 and 144 may be stably connected to the suction chamber S1.

The check valve 150 may be disposed in the discharge hole 125 and the discharge port 136 of the first flange 120 to open the discharge port 136 and the discharge hole 125 when the internal pressure of the compression chamber S2 is greater than or equal to a predetermined pressure.

The check valve 150 is opened when the refrigerant compressed in the compression chamber S2 is greater than or equal to a predetermined pressure, thereby structurally maintaining the pressure of the refrigerant compressed in the compression device 100.

The check valve 150 may include a check valve body 152 for opening and closing the discharge hole 125 and the discharge port 136, a check valve stopper 151 for restricting the movement of the check valve body 152, and a check valve fixing portion 153 for fixing the check valve body 152 and the check valve stopper 151 to the first flange 120.

The check valve body 152 may be formed to be larger than the diameter of the discharge hole 125 and may have a constant elasticity. For example, the elasticity of the check valve body 152 may correspond to the required pressure of the rotary compressor 1.

When the pressure of the compressed refrigerant in the compression chamber S2 is greater than the required pressure of the rotary compressor 1, the check valve body 152 may be moved by the compressed refrigerant to open the discharge hole 125 and the discharge port 136.

When the pressure of the refrigerant compressed in the compression chamber S2 is less than the required pressure of the rotary compressor 1, the check valve body 152 may be in contact with the discharge hole 125 to prevent the discharge hole 125.

The check valve stopper 151 may be formed at a predetermined angle to prevent the check valve body 152 from being bent over a predetermined angle while the check valve body 152 opens the discharge hole 125.

The check valve stopper 151 may be provided with a rivet-fastened portion on one side, such as the check valve body 152, and may be provided to be gradually upward from one side to the other.

The check valve 150 is to open and close the discharge hole 125 depending on the pressure in the compression chamber S2, and may prevent the refrigerant outside the first flange 120 from flowing backward to the compression chamber S2.

The check valve fixing portion 153 may have an approximate arc shape and may be coupled by a bolt, a screw, or the like, in addition to a rivet.

Referring to FIG. 6, the second flange 140 may be disposed under the cylinder 130 to be connected to the cylinder 130. The second flange 140 may be connected to the cylinder 130 through a mechanical connection to cover the upper surface of the internal space S of the cylinder 130.

The second flange 140 may include a second fixing hole 141 into which a second fixing member F2 is inserted. The cylinder 130 and the second flange 140 may be connected to each other through the second fixing member F2.

The second flange 140 may also include a second rotation-out hole 142 into which the rotary shaft 23 may be inserted. Accordingly, the rotary shaft 23 may be disposed through the cover member 110, the first flange 120, the cylinder 130, and the second flange 140.

The second flange 140 may include a second flow path groove 144 disposed on one surface 147 contacting the cylinder 130 to connect the second sub-suction port 132-2 to the suction chamber S1 (see FIG. 12).

The one surface 147 of the second flange 140 may refer to an upper surface of the second flange 140 adjacent to the cylinder 130.

The second flow path groove 144 may be connected to the second sub-suction port 132-2 to guide the refrigerant introduced from the main suction port 131 to the suction chamber S1 in the internal space S.

The second flow path groove 144 may form the second sub-flow path G3 along with the second sub-suction port 132-2 to guide a portion of the refrigerant introduced from the main flow path to the suction chamber S1.

When the refrigerant flows from the outside of the compression device 100 to the suction chamber S1, the second sub-flow path G3 may guide the stagnant refrigerant generated by the vortex in the main flow path G1 to the suction chamber S1, so that the inflow amount of the refrigerant flowing into the suction chamber S1 may increase, and the compression efficiency of the rotary compressor 1 may be improved.

In addition, through the first and second sub-flow paths G2 and G3, the refrigerant introduced from the main flow path G1 may be sucked into the suction chamber S1 in a distributed state.

Referring to FIG. 7, the cylinder 130 may include a rolling piston 133 which is provided inside the casing 10 and is eccentrically rotated in the internal space S, a vane 134 which contacts the rolling piston 133 and divides the internal space S into the suction chamber S1 and the compression chamber S2, and a main suction port 131 that connects the suction chamber S1 to an outside of the cylinder 130.

The vane 134 is movably disposed in the internal space S of the cylinder 130, and is provided in contact with the rolling piston 133 in a radial direction so as to divide the internal space S into the suction chamber S1 and the compression chamber S2.

The cylinder 130 may include a guide portion 135 guiding the vane 134 to reciprocate in a direction in which the vane 134 is in contact with the rolling piston 133.

The guide portion 135 is recessed toward the outside of the internal space S, and may guide the vane 134 so that the vane 134 may advance and retreat together with the rotation.

An elastic member E for continuously applying elastic force to the vane 134 in the direction of the rolling piston 133 may be disposed at one side of the guide portion 135. Accordingly, even when the rolling piston 133 rotatably moves within the internal space S due to the rotation of the rotary shaft 23, the vane 134 may be continuously in contact with the rolling piston 133 by the elastic member E.

Accordingly, when the rolling piston 133 rotatably moves, the suction chamber S1 and the compression chamber S2 may be spatially partitioned in a continuous manner.

The rolling piston 133 may be disposed in the internal space S of the cylinder 130 to rotatably move along the inner circumferential surface forming the internal space S of the cylinder 130.

The rolling piston 133 may be formed in a cylindrical shape, and an eccentric portion 24 coupled with the rotary shaft 23 may be disposed therein. As the rotary shaft 23 rotates, the eccentric portion 24 may move, thereby causing the rolling piston 133 to rotatably move.

The internal space S refers to a space in which the sucked refrigerant is compressed, and may be formed inside the cylinder 130. The internal space S may be in a cylindrical shape, but may vary depending on the shape of the rolling piston 133.

The internal space S may include the suction chamber S1 and the compression chamber S2 separated by the vane 134. The suction chamber S1 and the compression chamber S2 may not be continuously divided, but may be continuously repeated as being connected and divided by the rotation movement of the rolling piston 133.

The suction chamber S1 is connected to the main suction port 131 and the sub-suction port 132, and the refrigerant introduced through the main suction port 131 and the sub-suction port 132 is located.

The compression chamber S2 is a space in which the introduced refrigerant is compressed by the rotation movement of the rolling piston 133, and the space may become narrow and wide by the rotation movement of the rolling piston 133.

Referring to FIGS. 7 to 8, the main suction port 131 may be extensively formed over the outer circumferential surface and the inner circumferential surface of the cylinder 130, and may connect the outside of the cylinder 130 and the internal space S of the cylinder 130.

The main suction port 131 may form the flow path for moving the refrigerant outside the cylinder 130 to the suction chamber S1 of the cylinder 130.

The main suction port 131 may be disposed adjacent to the vane 134. Accordingly, the rotation distance of the rolling piston 133 may be increased, and the compression time and distance of the refrigerant in the internal space S may be increased. Therefore, the compression efficiency of the rotary compressor 1 may be improved.

The main suction port 131 may include a sub-suction port 132 extending in a direction in which at least one of the first flange 120 and the second flange 140 is disposed.

For example, the sub-suction port 132 may include a first sub-suction port 132-1 extending in a direction in which the first flange 120 is disposed, and a second sub-suction port 132-2 extending in a direction in which the second flange 140 is disposed.

The first sub-suction port 132-1 and the second sub-suction port 132-2 may be arranged to face each other. Accordingly, the refrigerant flowing from the main suction port 131 may not be eccentrically flown to any one of the first sub-suction port 132-1 and the second sub-suction port 132-2, and may be uniformly distributed to the first sub-suction port 132-1 and the second sub-suction port 132-2.

Accordingly, the refrigerant may be introduced into the internal space S without flow stagnation of the introduced refrigerant, and the flow amount of the refrigerant may increase.

Each of the first sub-suction port 132-1 and the second sub-suction port 132-2 may be spaced apart from the suction chamber S1, and may be disposed adjacent to the suction chamber S1. Unlike the main flow path G1 formed by the main suction port 131, the first sub-suction port 132-1 and the second sub-suction port 132-2 may form second and third sub-flow paths G2 and G3 that are substantially separated from the main flow path G1.

Hereinbelow, a specific structure of the main suction port 131 according to an embodiment will be described with reference to FIGS. 9 to 11B.

Figure 9:
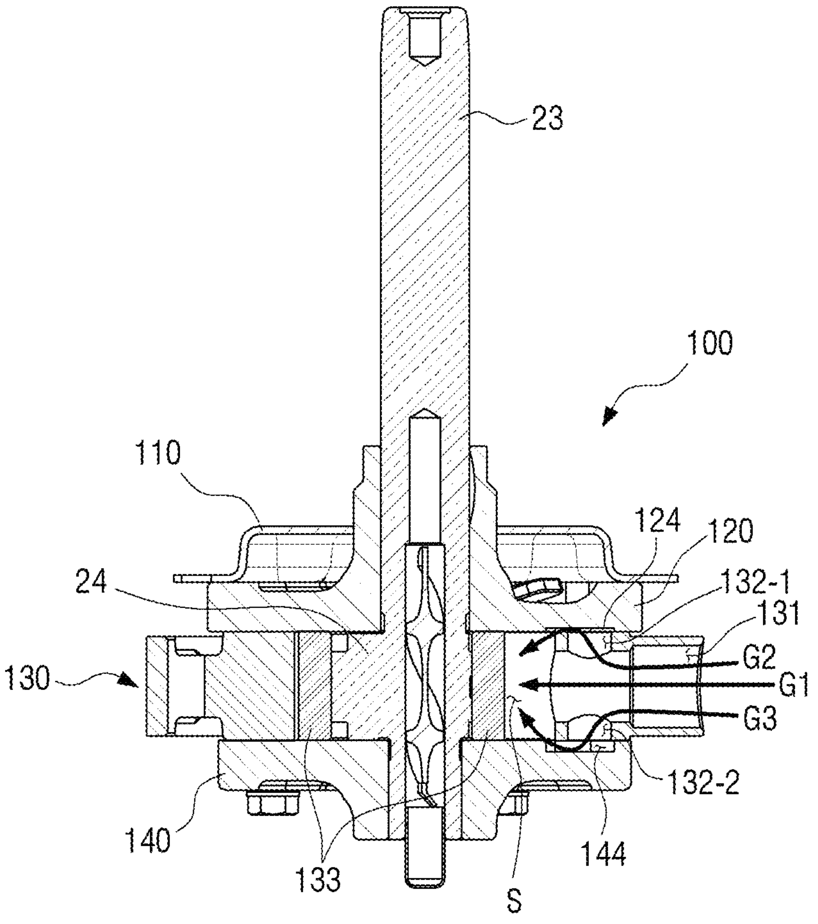
FIG. 9 is a cross-sectional perspective view taken along C-C line of FIG. 7.
Figure 10:
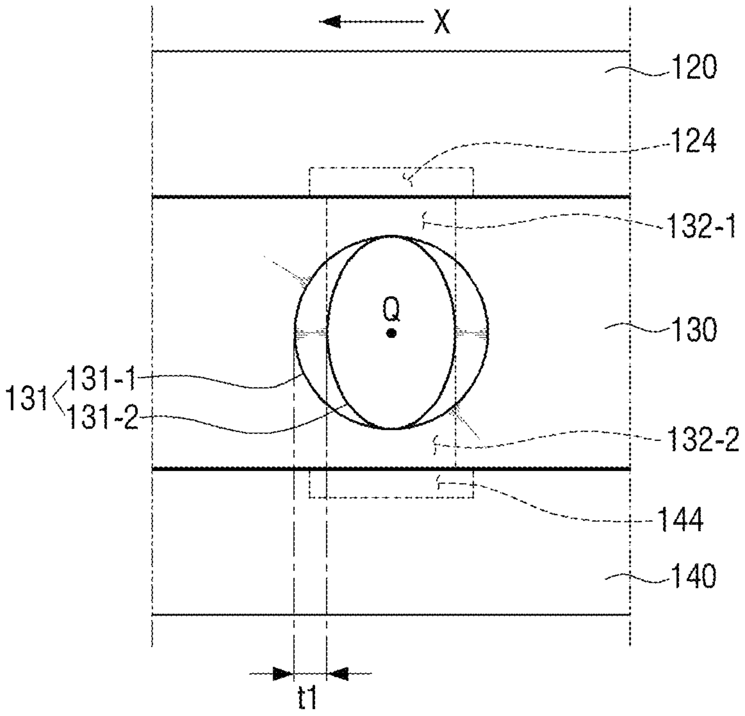
FIG. 10 is an enlarged front view illustrating an A area of FIG. 7.
Figure 11A:
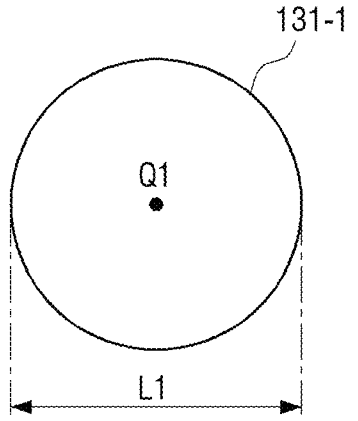
FIG. 11A is a front view illustrating a shape of a first suction port according to an embodiment of the disclosure.
Figure 11B:
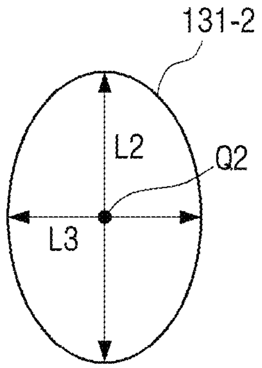
FIG. 11B is a front view illustrating a shape of a second suction port according to an embodiment of the disclosure.

FIG. 9 is a cross-sectional perspective view taken along C-C line of FIG. 7; FIG. 10 is an enlarged front view illustrating an A area of FIG. 7; FIG. 11A is a front view illustrating a shape of a first main suction port 131-1 according to an embodiment of the disclosure; and FIG. 11B is a front view illustrating a shape of a second main suction port 131-2 according to an embodiment of the disclosure.

Referring to FIG. 9, the refrigerant outside the compression device 100 may be connected to the main flow path G1, and may be introduced into the internal space S of the cylinder 130 through the first and second sub-flow paths G2 and G3 branched in the upward and downward directions of the main flow path G1.

The main flow path G1 is formed by the main suction port 131 of the cylinder 130.

The first sub-flow path G2 may be formed by the first sub-suction port 132-1 which is extended in a direction where the flange 120 is disposed from an upper portion of one side of the main suction port 131 and the first flow path groove 124 of the first flange 120 disposed at a position corresponding to the first sub-suction port 132-1.

The second sub-flow path G3 may be formed by the second sub-suction port 132-2 extending in a direction in which the second flange 140 is disposed from a lower portion of a side of the main suction port 131 and the second flow path groove 144 of the second flange 140 disposed at a position corresponding to the second sub-suction port 132-2.

The first flow path groove 124 and the second flow path groove 144 may be disposed to face each other. Accordingly, the refrigerant flowing from the main suction port 131 may be uniformly distributed to the first sub-suction port 132-1 and the second sub-suction port 132-2, without being eccentrically introduced to any one of the first sub-suction port 132-1 and the second sub-suction port 132-2.

The first flow path groove 124 and the second flow path groove 144 may have different thicknesses and may be the same as necessary. For example, the depth of the first flow path groove 124 and the second flow path groove 144 may be 1 mm or more.

The main suction port 131 may include a first main suction port 131-1 disposed on an outer circumferential surface of the cylinder 130 and having a first cross-sectional area, and a second main suction port 131-2 disposed on an inner circumferential surface of the cylinder 130 and having a second cross-sectional area smaller than the first cross-sectional area.

For example, when the cross-sectional shape of the first main suction port 131-1 and the second main suction port 131-2 is in a circular shape, the diameter of the first main suction port 131-1 may be larger than the diameter of the second main suction port 131-2.

As shown in FIG. 10, the central axis Q1 of the first main suction port 131-1 and the central axis Q2 of the second main suction port 131-2 may be disposed on the same axis Q.

Accordingly, a first additional rotational movement distance t1 between the first main suction port 131-1 and the second main suction port 131-2 may be implemented with respect to the rotational movement X of the rolling piston 133.

For example, referring to FIG. 11A, the cross-section of the first main suction port 131-1 may be circular having a first radius R1. Referring to FIG. 11B, the second main suction port 131-2 may have an elliptical shape in which the cross section has a long axis L2 and a short axis L3, and the short axis L3 may be disposed in the rotational direction X of the rolling piston 133.

The difference in length between the short axis L3 of the second main suction port 131-2 and the diameter L1 of the first main suction port 131-1 may form the first additional rotational movement distance t1.

Compression of the refrigerant in accordance with rotation of the rolling piston 133 depends on the rotational movement distance and the moving angle of the rolling piston 133, and the rotational movement distance and the movement angle of the rolling piston 133 may be proportional to the distance between the main suction port 131 and the discharge port 136 in the internal space S.

The substantial rotational movement distance and the moving angle of the rolling piston 133 may increase by the first additional rotational movement distance t1 formed due to the difference in diameter between the first main suction port 131-1 and the second main suction port 131-2, and the compression time of the refrigerant inside the internal space S may increase, and accordingly, the compression efficiency of the rotary compressor 1 may be improved.

The pressure and temperature of the refrigerant may be discharged from the discharge port 136 under the same power consumption.

Figure 12A:
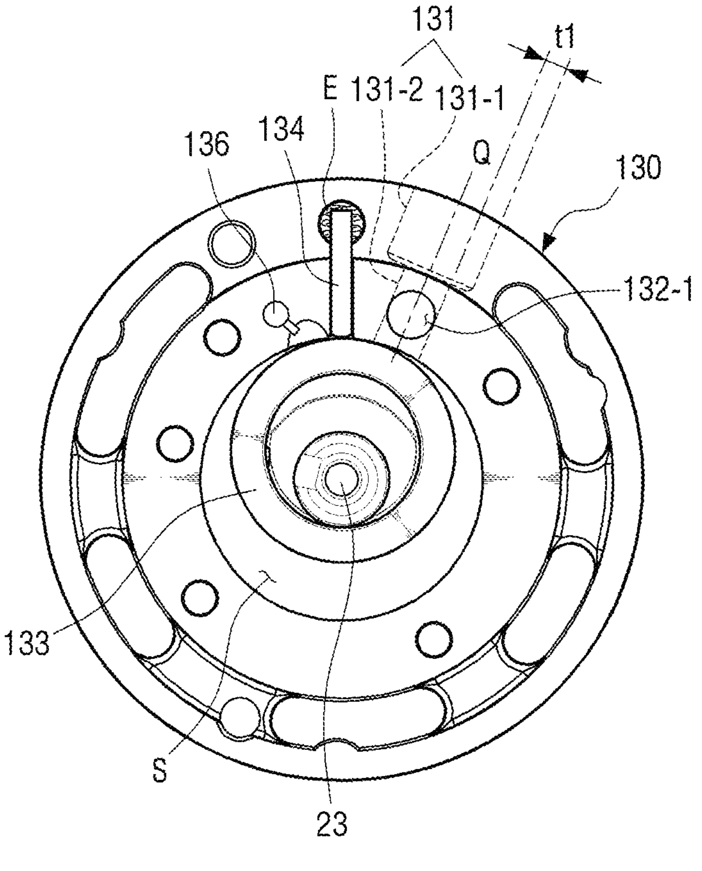
FIG. 12A is a top view illustrating a first state of a cylinder connected to a rotary shaft according to an embodiment of the disclosure.
Figure 12B:
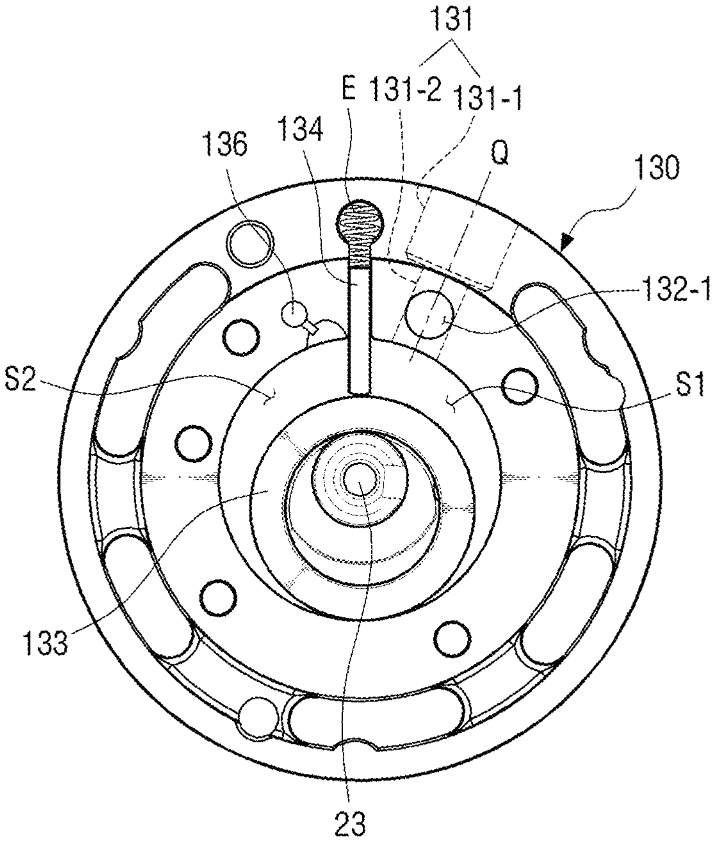
FIG. 12B is a top view illustrating a second state of a cylinder connected to a rotary shaft according to an embodiment of the disclosure.
Figure 12C:
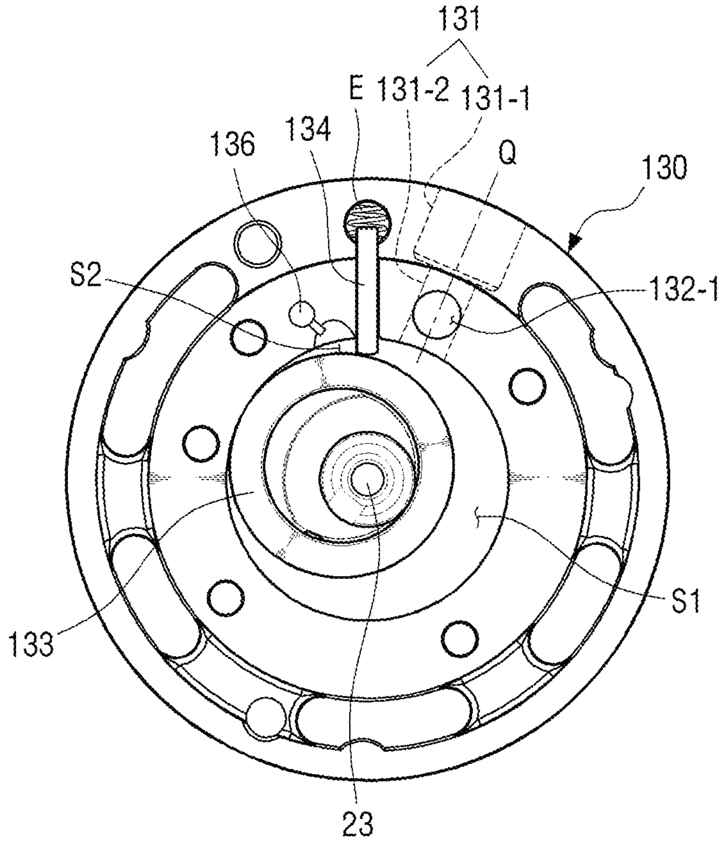
FIG. 12C is a top view illustrating a third state of a cylinder connected to a rotary shaft according to an embodiment of the disclosure.
Figure 13:
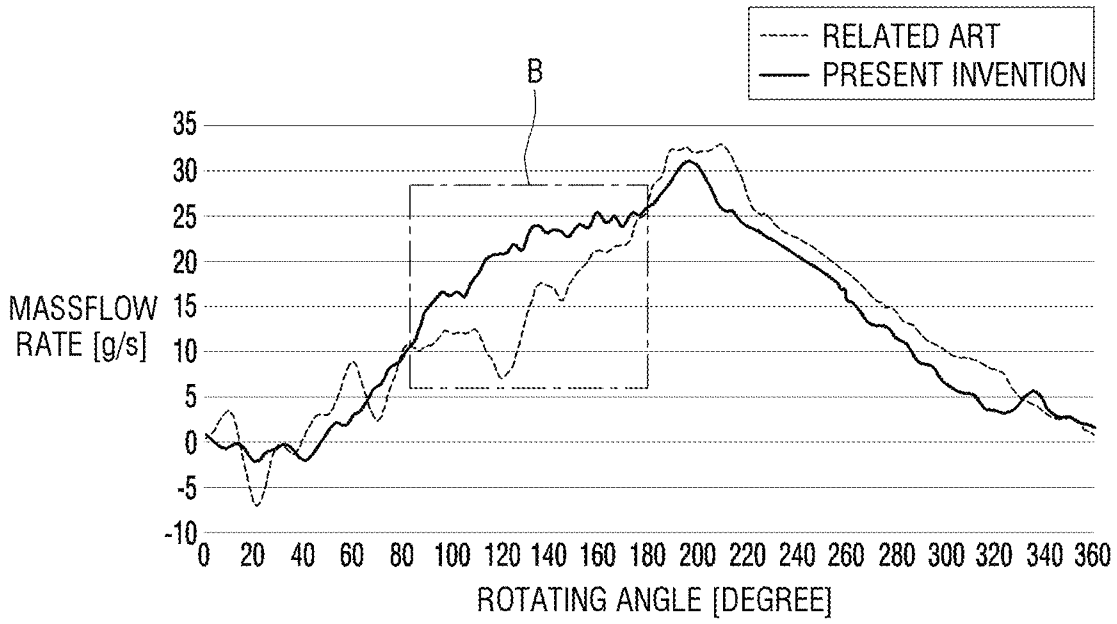
FIG. 13 is a graph of comparison of flow between a rotary compressor and a related-art compressor according to an embodiment of the disclosure.

With reference to FIGS. 12A to 13, the operation of the rotary compressor 1 according to an embodiment will be described.

FIG. 12A is a top view illustrating a first state of a cylinder 130 connected to a rotary shaft 23 according to an embodiment of the disclosure; FIG. 12B is a top view illustrating a second state of a cylinder 130 connected to a rotary shaft 23 according to an embodiment of the disclosure; FIG. 12C is a top view illustrating a third state of a cylinder 130 connected to a rotary shaft 23 according to an embodiment of the disclosure; and FIG. 13 is a graph of comparison of flow between a rotary compressor 1 and a related-art compressor according to an embodiment of the disclosure.

As shown in FIG. 12A, the vane 134 is maximally inserted into the guide portion 135, and the rolling piston 133 may be in close contact with one side of the cylinder 130 having the guide portion 135 formed thereon. The refrigerant may be introduced into the internal space S through the main suction port 131.

The refrigerant may be introduced into the internal space S through the main suction port 131 and the sub-suction port 132 connecting the main suction port 131 and the internal space S.

As shown in FIG. 12B, the rotary shaft 23 is rotated by the driver 20, and the rolling piston 133 connected to the rotary shaft 23 may rotate in a predetermined direction.

The vane 134 may move by the elastic member E as much as the distance traveled by the rolling piston 133 and may be simultaneously in contact with the rolling piston 133. Accordingly, the internal space S of the cylinder 130 may be divided into a suction chamber S1 and a compression chamber S2.

The compression chamber S2 is a space in which the previously introduced refrigerant is compressed, and the suction chamber S1 may be a space in which the refrigerant continuously flows through the main suction port 131 and the sub-suction port 132.

As the rotary shaft 23 and the rolling piston 133 are continuously moved, the space of the compression chamber S2 may be narrowed and the refrigerant in the compression chamber S2 may be compressed to be high temperature and high pressure.

The compressed high temperature and high pressure refrigerant may be discharged to the outside of the compression device 100 through the discharge port 136. The compressed high temperature and high pressure refrigerant may maintain a pressure of at least a predetermined pressure by the check valve 150.

As shown in FIG. 13, the rotary compressor 1 according to an embodiment of the disclosure may have improved mass flow of the refrigerant with respect to the rotating angle of the rolling piston 133.

The mass flow of the refrigerant with respect to the B area may be greatly improved, and the mass flow of the refrigerant with respect to all the rotation angles of the rolling piston 133 corresponding to the entire area of the graph may be also improved.

Through the structure of the main suction port 131 and the sub-suction port 132 according to an embodiment of the disclosure, the inflow amount of the refrigerant flowing into the internal space S may be improved, and at the same time, the rotational movement distance of the rolling piston 133 may be improved, thereby greatly improving the compression efficiency of the rotary compressor 1.

Hereinafter, a specific structure of a main suction port 131' according to another embodiment will be described.

The same reference numerals are used for the same configuration, and a redundant description thereof will be omitted. For example, since the first flange 120, the cylinder 130, the second flange 140, the first and second flow path grooves 124 and 144, the first and second sub-suction ports 132-1 and 132-2 are the same as described above, a redundant description will be omitted.

Figure 14A:
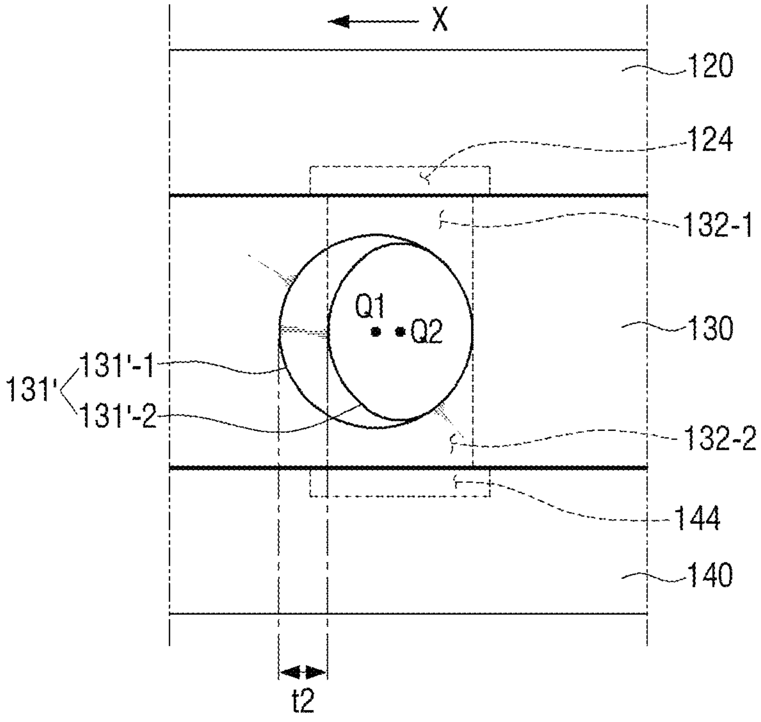
FIG. 14A is a front view illustrating a main suction port according to another embodiment of the disclosure.
Figure 14B:
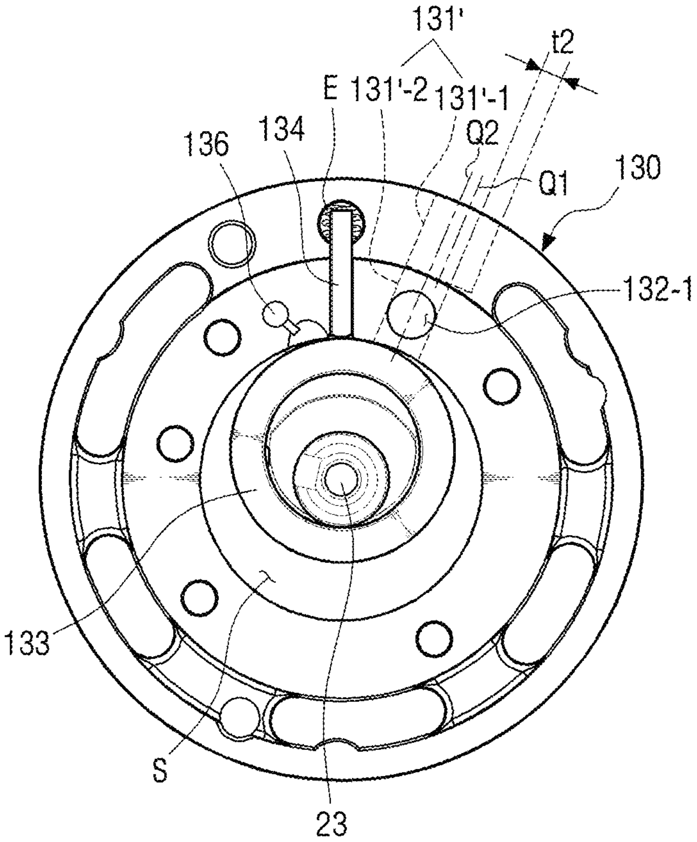
FIG. 14B is a top view illustrating a cylinder including a main suction port according to another embodiment of the disclosure.

FIG. 14A is a front view illustrating a main suction port 131' according to another embodiment of the disclosure and FIG. 14B is a top view illustrating a cylinder 130 including a main suction port 131' according to another embodiment of the disclosure.

The shape of the first main suction port 131'-1 and the second main suction port 131'-2 are as described above, a redundant description will be omitted.

As shown in FIGS. 14A and 14B, the central axis Q2 of the second main suction port 131'-2 may be disposed adjacent to the vane 134 with respect to the rotational movement direction of the rolling piston 133 than the central axis Q1 of the first main suction port 131'-1.

The central axis Q2 of the second main suction port 131'-2 does not coincide with the central axis Q1 of the first main suction port 131'-1, and may be eccentrically disposed in a direction opposite to the rotational movement direction of the rolling piston 133.

A second additional rotational movement distance t2 between the first main suction port 131'-1 and the second main suction port 131'-2 may be implemented with respect to the rotation direction X of the rolling piston 133.

In addition to the first additional rotational movement distance t1 due to the difference in the diameter of the first main suction port 131'-1 and the second main suction port 131'-2, a second additional rotational movement distance t2, which is greater than the first additional rotational movement distance t1, may be realized through the eccentric arrangement structure of the central axis Q2 of the second main suction port 131'-2 and the central axis Q1 of the first main suction port 131'-1.

The rotational moving distance and the moving angle of the rolling piston 133 are increased by the second additional rotational movement distance t2, and the compression efficiency of the rotary compressor 1 may be improved by increasing the compression time of the refrigerant in the internal space S.

The pressure and temperature of the refrigerant discharged from the discharge port 136 may be improved under the same power consumption.

Hereinbelow, with reference to FIG. 15, a structure of a rotary compressor 1' according to a still another embodiment will be described.

Figure 15:
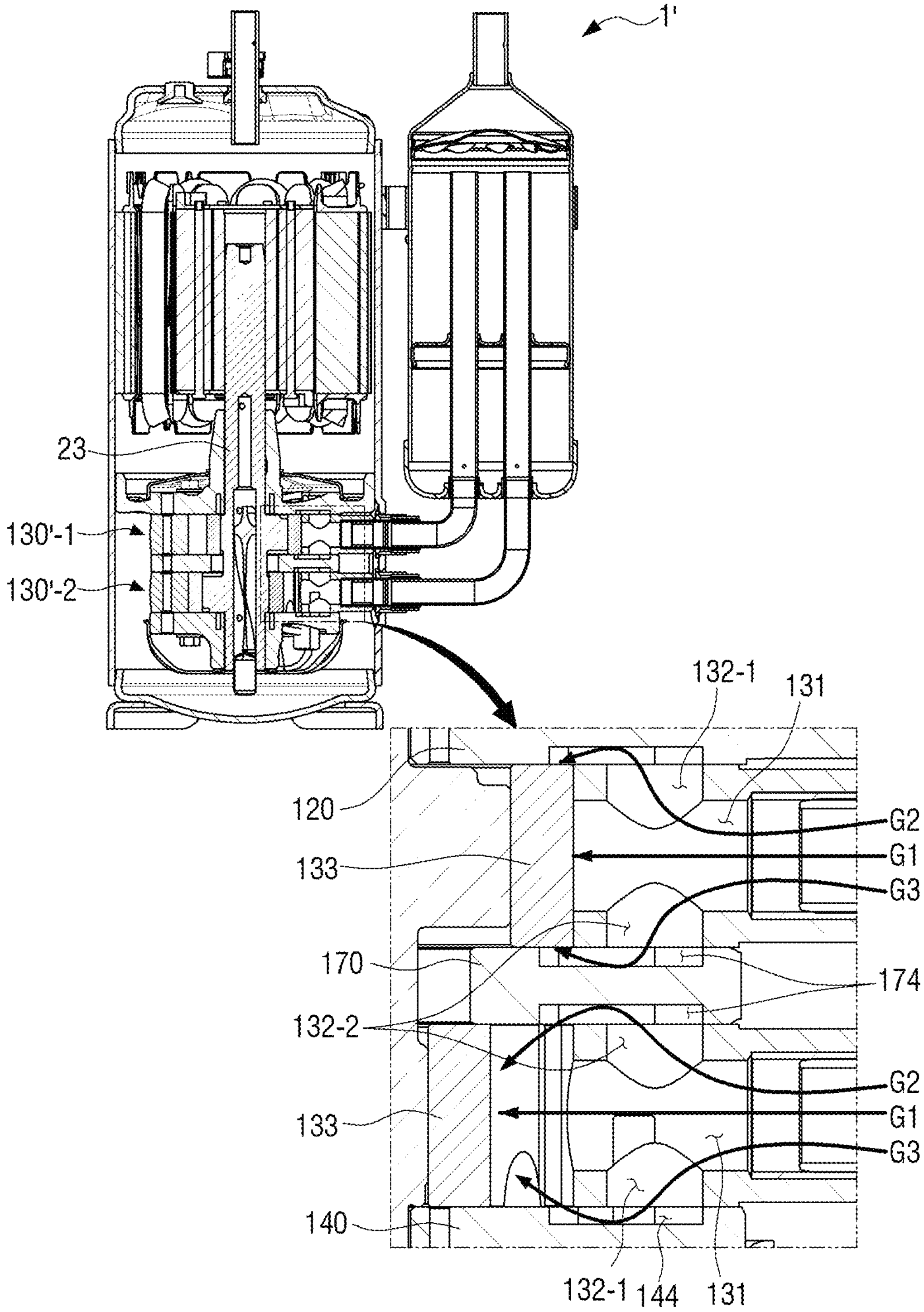
FIG. 15 is a cross-sectional view illustrating a rotary compressor according to a still another embodiment of the disclosure.

FIG. 15 is a cross-sectional view illustrating a rotary compressor 1' according to a still another embodiment of the disclosure.

The same reference numerals are used for the same configuration, and a duplicated description thereof will be omitted. For example, since the first flange 120, the cylinder 130, the second flange 140, the first and second flow path grooves 124 and 144, the first and second sub-suction ports 132-1 and 132-2 are the same as described above, a repeated description thereof will be omitted.

Referring to FIG. 15, the rotary compressor 1' may include a plurality of cylinders. For example, the first cylinder 130'-1 and the second cylinder 130'-2 may be connected to the same rotary shaft 23.

The first cylinder 130'-1 and the second cylinder 130'-2 may be disposed in upward and downward directions, and a middle flange 170 may be disposed between the first cylinder 130'-1 and the second cylinder 130'-2.

The first flange 120 may be disposed at an upper portion of the first cylinder 130'-1, and the middle flange 170 may be disposed at a lower portion of the first cylinder 130'-1. The middle flange 170 may be disposed at an upper portion of the second cylinder 130'-2, and the second flange 140 may be disposed at a lower portion of the second cylinder 130'-2.

The third flow path grooves 174 may be formed at an upper surface and a lower surface of the middle flange 170.

The third flow path groove 174 formed on the upper surface of the middle flange 170 may be disposed to face the first flow path groove 124 of the first flange 120, and may form the second sub-flow path G2 of the first cylinder 130'-1.

The third flow path groove 174 formed on the lower surface of the middle flange 170 may be disposed to face the second flow path groove 144 of the second flange 140 and may form the third sub-flow path G3 of the second cylinder 130'-2.

The compression efficiency of the rotary compressor 1' may be greatly improved by driving a plurality of cylinders having the main suction port 131 and the sub-suction port 132 according to an embodiment of the disclosure using the driving force transmitted from one driver 20.

A plurality of cylinders of a compact and simple structure may be provided using one middle flange 170.

In the above, various embodiments of the disclosure have been described respectively and individually, but each embodiment may not necessarily be implemented on its own, and the configuration and operations of each embodiment may be implemented in combination with at least one other embodiment.

While preferred embodiments of the disclosure have been shown and described, the disclosure is not limited to the aforementioned specific embodiments, and it is apparent that various modifications may be made by those having ordinary skill in the technical field to which the disclosure belongs, without departing from the gist of the disclosure as claimed by the appended claims. Also, it is intended that such modifications are not to be interpreted independently from the technical idea or prospect of the disclosure.

Although the present disclosure has been described with various embodiments, various changes and modifications may be suggested to one skilled in the art. It is intended that the present disclosure encompass such changes and modifications as fall within the scope of the appended claims.

What is claimed is:

1. A rotary compressor comprising:
a casing forming an outer shape;
a cylinder having an internal space, disposed inside the casing and comprising:
 a rolling piston configured to rotate eccentrically in the internal space,
 a vane configured to contact the rolling piston and divide the internal space into a suction chamber and a compression chamber, and
 a main suction port connecting the suction chamber to an outside of the cylinder;
a first flange disposed above the cylinder; and
a second flange disposed below the cylinder,
wherein the main suction port comprises:
 a sub suction port extending in a direction in which at least one among the first flange and the second flange is disposed;
 a first main suction port disposed at an outer circumferential surface of the cylinder and has a first cross-sectional area; and
 a second main suction port disposed at an inner circumferential surface of the cylinder, connected to the first main suction port, and has a second cross-sectional area smaller than the first cross-sectional area; and
 wherein the first and the second main suction ports each have a constant diameter in their cross-sections,
 wherein at least one among the first flange and the second flange includes a flow path groove connecting the sub suction port and the suction chamber,
 wherein the first main suction port has a circular shape, and
 wherein the second main suction port has an elliptical shape in which a cross section has a short axis disposed in a rotational direction of the rolling piston.

2. The rotary compressor of claim 1, wherein:
the sub suction port comprises:

a first sub-suction port extending in a direction in which the first flange is disposed, and a second sub-suction port extending in a direction in which the second flange is disposed, the first flange comprises a first flow path groove that is disposed on a surface contacting the cylinder to connect the first sub-suction port to the suction chamber, and the second flange comprises a second flow path groove that is disposed on a surface contacting the cylinder to connect the second sub-suction port to the suction chamber.

3. The rotary compressor of claim 2, wherein a central axis of the first sub-suction port is parallel to a central axis of the second sub-suction port.

4. The rotary compressor of claim 2, wherein each of the first sub-suction port and the second sub-suction port are spaced apart from the internal space of the cylinder and are disposed to be adjacent to the suction chamber in relation to the internal space.

5. The rotary compressor of claim 2, wherein the first flow path groove is arranged on the first flange to face the second flow path groove arranged on the second flange.

6. The rotary compressor of claim 1, wherein a central axis of the first main suction port is disposed coaxially to a central axis of the second main suction port.

7. The rotary compressor of claim 1, wherein a central axis of the second main suction port is disposed to be closer to the vane with respect to a rotary movement direction of the rolling piston than the central axis of the first main suction port.

8. The rotary compressor of claim 1, wherein the flow path groove is formed in relation to the suction chamber so as to overlap with a rotation radius of the rolling piston.

9. The rotary compressor of claim 1, wherein:

the cylinder includes a discharge port connected to the compression chamber, and the first flange includes a check valve disposed in the discharge port and configured to open the discharge port if pressure inside the compression chamber is greater than or equal to a preset pressure.

10. A rotary compressor comprising:

a casing forming an outer shape; and a cylinder having an internal space, disposed inside the casing and comprising:

a rolling piston configured to rotate eccentrically in the internal space, a vane configured to contact the rolling piston and divide the internal space into a suction chamber and a compression chamber, and a main suction port connecting an outside and the suction chamber, wherein the main suction port comprises:

a first main suction port disposed at an outer circumferential surface of the cylinder and has a first cross-sectional area; and a second main suction port disposed at an inner circumferential surface of the cylinder, connected to the first main suction port, and has a second cross-sectional area smaller than the first cross-sectional area, wherein the first and the second main suction ports each have a constant diameter in their cross-section;

wherein the first main suction port has a circular shape, and wherein the second main suction port has an elliptical shape in which a cross section has a short axis disposed in a rotational direction of the rolling piston.

11. The rotary compressor of claim 10, wherein a central axis of the first main suction port is disposed coaxially to a central axis of the second main suction port.

12. The rotary compressor of claim 10, wherein a central axis of the second main suction port is disposed to be closer to the vane with respect to a rotary movement direction of the rolling piston than the central axis of the first main suction port.

13. The rotary compressor of claim 10, wherein:

the cylinder comprises a discharge port connected to the compression chamber, and a rotational movement distance and a movement angle of the rolling piston are proportional with distance between the main suction port and the discharge port.

14. A home appliance for adjusting temperature through heat exchange with an outside using a refrigerant, the home appliance comprises:

a rotary compressor configured to compress the refrigerant, and including:

a casing forming an outer shape, a cylinder having an internal space, disposed inside the casing and comprising a rolling piston configured to rotate eccentrically in the internal space, a vane configured to contact the rolling piston and divide the internal space into a suction chamber and a compression chamber, a main suction port connecting the suction chamber to an outside of the cylinder, a first flange disposed at an upper portion of the cylinder, a second flange disposed at a lower portion of the cylinder, wherein the main suction port includes a sub suction port extending in a direction in which at least one of the first flange and the second flange is disposed;

a first main suction port disposed at an outer circumferential surface of the cylinder and has a first cross-sectional area; and a second main suction port disposed at an inner circumferential surface of the cylinder, connected to the first main suction port, and has a second cross-sectional area smaller than the first cross-sectional area; and wherein the first and the second main suction ports each have a constant diameter in their cross-sections, wherein at least one of the first flange and the second flange include a flow path groove connecting the sub suction port to the suction chamber, wherein the first main suction port has a circular shape, and wherein the second main suction port has an elliptical shape in which a cross section has a short axis disposed is a rotational direction of the rolling piston.

15. The home appliance of claim 14, wherein a central axis of a first main suction port is disposed coaxially to a central axis of the second main suction port.

* * * * *